United States Patent [19]
Sands

[11] Patent Number: 5,623,843
[45] Date of Patent: Apr. 29, 1997

[54] MOTORCYCLE TETHERING DEVICE

[76] Inventor: Joseph E. Sands, 2013 NE. 2nd St., Ocala, Fla. 32670

[21] Appl. No.: 424,710

[22] Filed: Apr. 17, 1995

[51] Int. Cl.$^6$ .............................. E05B 71/00; B62H 5/00
[52] U.S. Cl. ....................... 70/234; 52/162; 248/499; 70/62
[58] Field of Search .................... 70/233–235, 62, 70/14, 30, 49; 248/499, 500, 503, 507–511; 52/155, 160, 162, 163

[56] References Cited

U.S. PATENT DOCUMENTS

| | | | |
|---|---|---|---|
| 362,183 | 5/1887 | Runyon | 52/162 |
| 742,279 | 10/1903 | Bearse | 52/162 |
| 756,640 | 4/1904 | Irons | 52/162 X |
| 769,083 | 8/1904 | Hick | 52/162 |
| 1,008,323 | 11/1911 | Gillespie | 52/162 |
| 1,086,053 | 2/1914 | Howell | 52/162 |
| 1,169,821 | 2/1916 | Hindmarsh | 52/162 |
| 2,455,800 | 12/1948 | Oliver | 52/162 |
| 2,771,163 | 11/1956 | Mafera, Jr. | 52/162 X |
| 3,865,246 | 2/1975 | Lieb et al. | 70/234 X |
| 3,965,709 | 6/1976 | Belke | 70/234 X |
| 3,996,775 | 12/1976 | Waldron | 70/234 |
| 4,522,530 | 6/1985 | Arthur | 52/155 X |
| 5,040,924 | 8/1991 | Kothman | 248/499 X |
| 5,175,966 | 1/1993 | Remke et al. | 52/163 |
| 5,349,834 | 9/1994 | Davidge | 70/234 X |
| 5,456,443 | 10/1995 | Taaffe | 248/499 X |
| 5,463,834 | 11/1995 | Krieger | 52/155 |

FOREIGN PATENT DOCUMENTS

| | | | |
|---|---|---|---|
| 38410 | 2/1928 | Denmark | 248/508 |
| 52704 | 2/1937 | Denmark | 52/162 |

*Primary Examiner*—Suzanne L. Dino
*Attorney, Agent, or Firm*—Dominik & Stein

[57] ABSTRACT

A motorcycle anchoring device capable of being driven through asphalt, tarmac, or pavement, and to which a motorcycle can be tethered, thereby providing an anti-theft security when no other mechanism for securing is available. The device is in the form of a solid metal stake designed to be driven through the asphalt or tarmacadam commonly used in a paved parking lot or roadway. The stake includes collapsible barbs or flukes which retract while the stake is being driven into the ground, then deploy after the spike is in the ground, particularly as someone attempts to extract the stake from the ground. The barbs thus provide some in-ground stability, but mainly serve to prevent the spike from being raised. The exposed upper end of the spike is designed to permit secure tethering of the motorcycle to the stake, thereby securing against unintended removal and usage. Once the stake is no longer required, the stake is simply and easily driven completely into the ground.

2 Claims, 6 Drawing Sheets

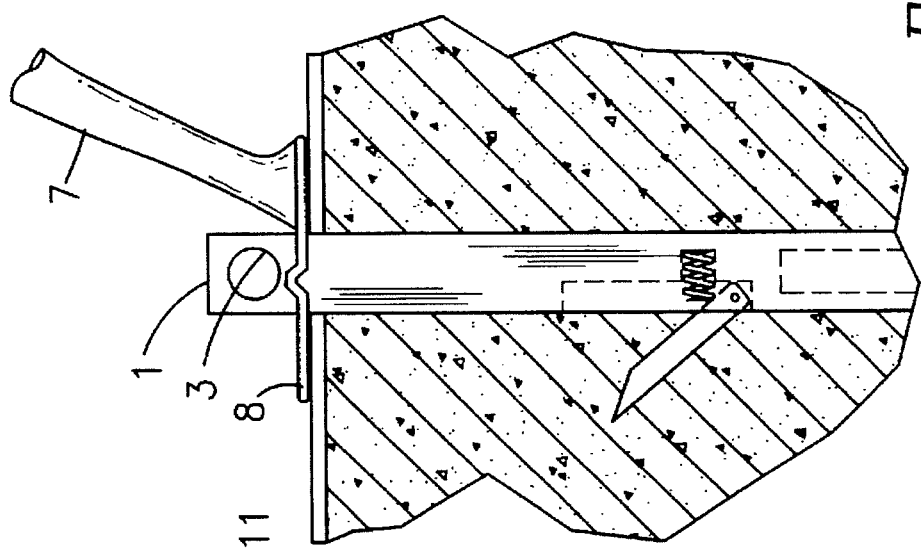
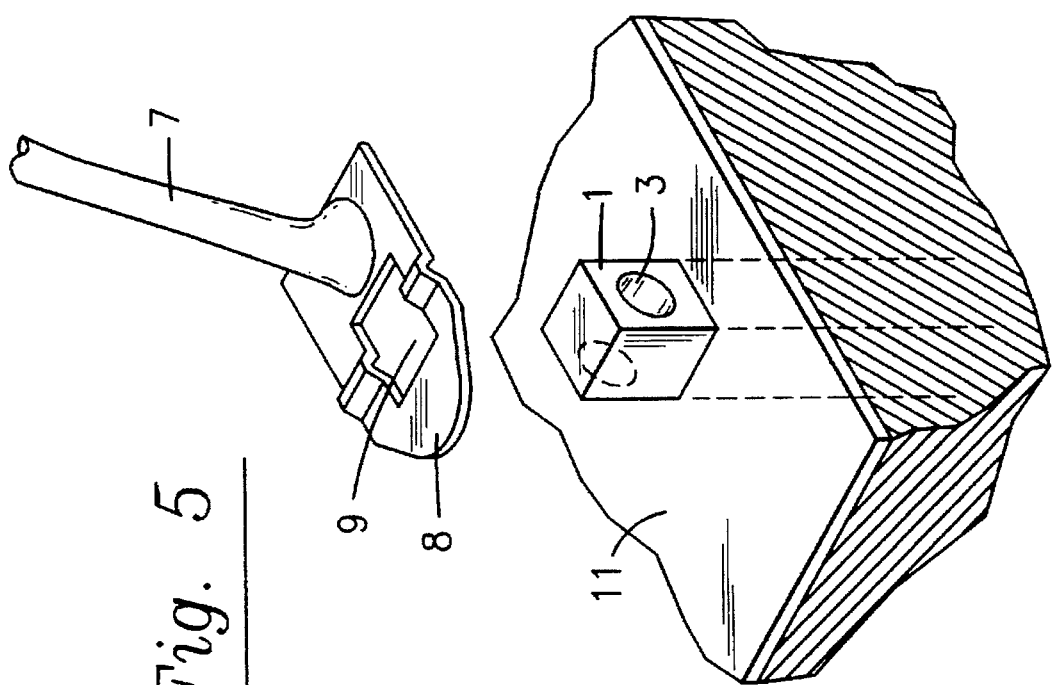

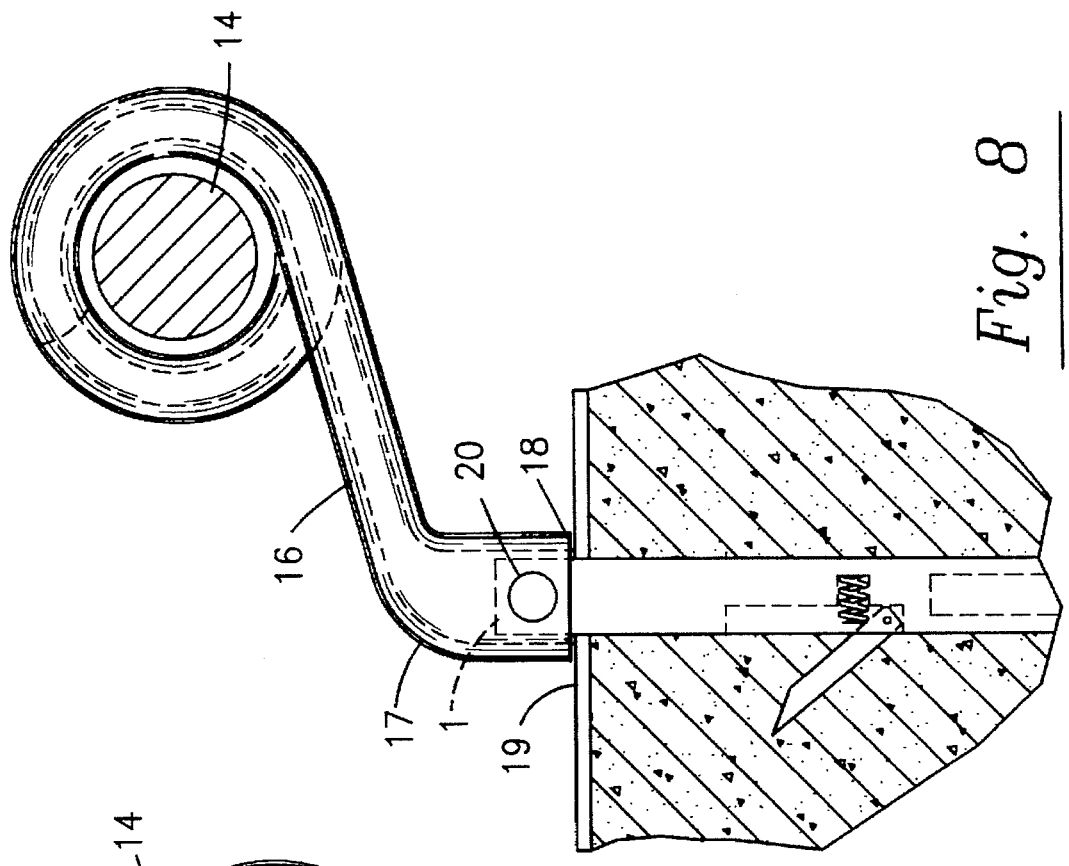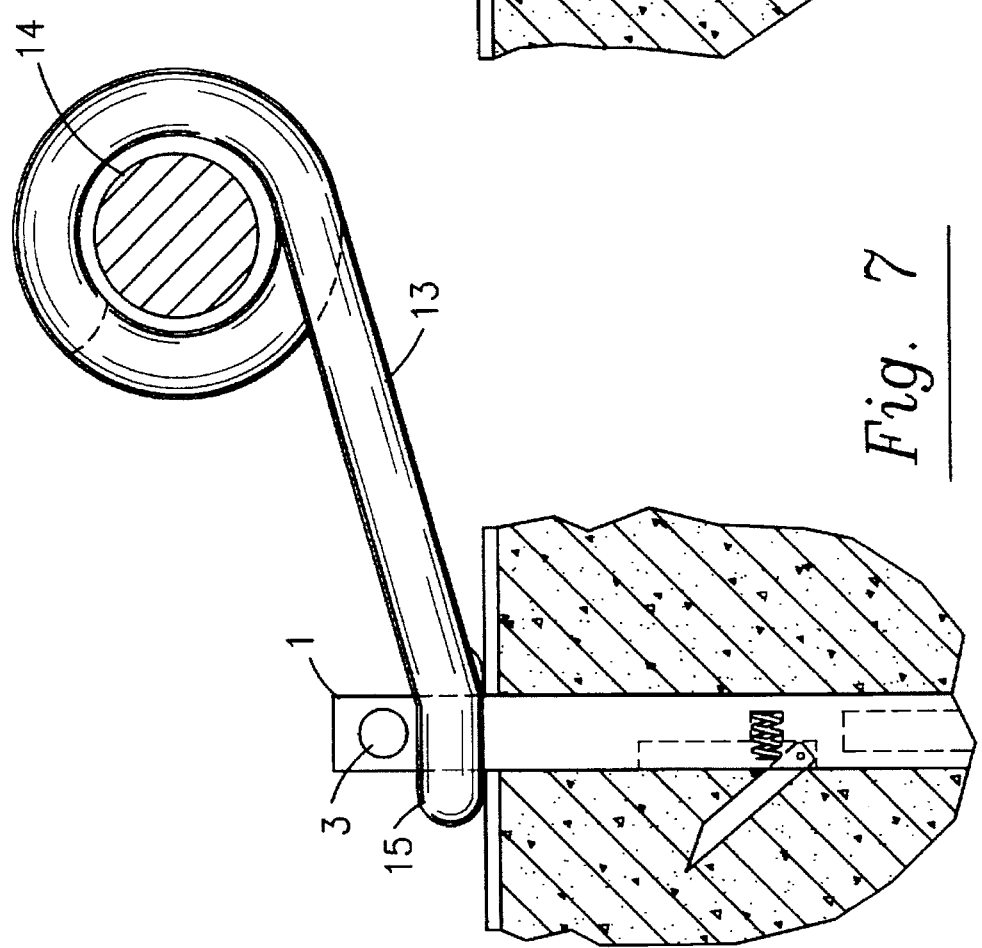

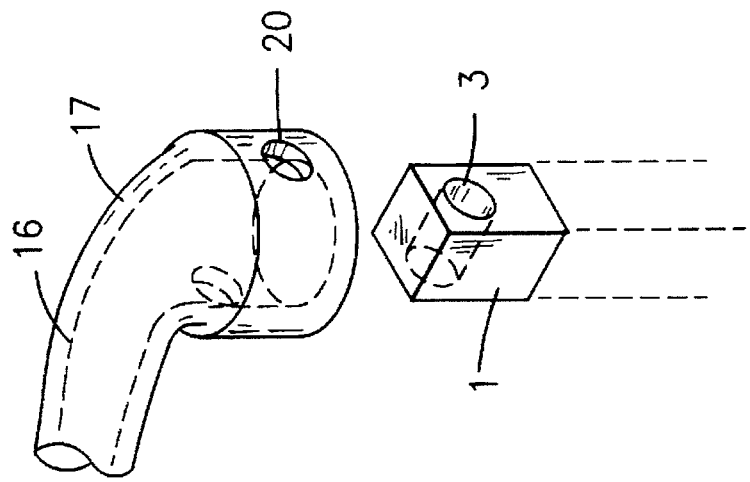
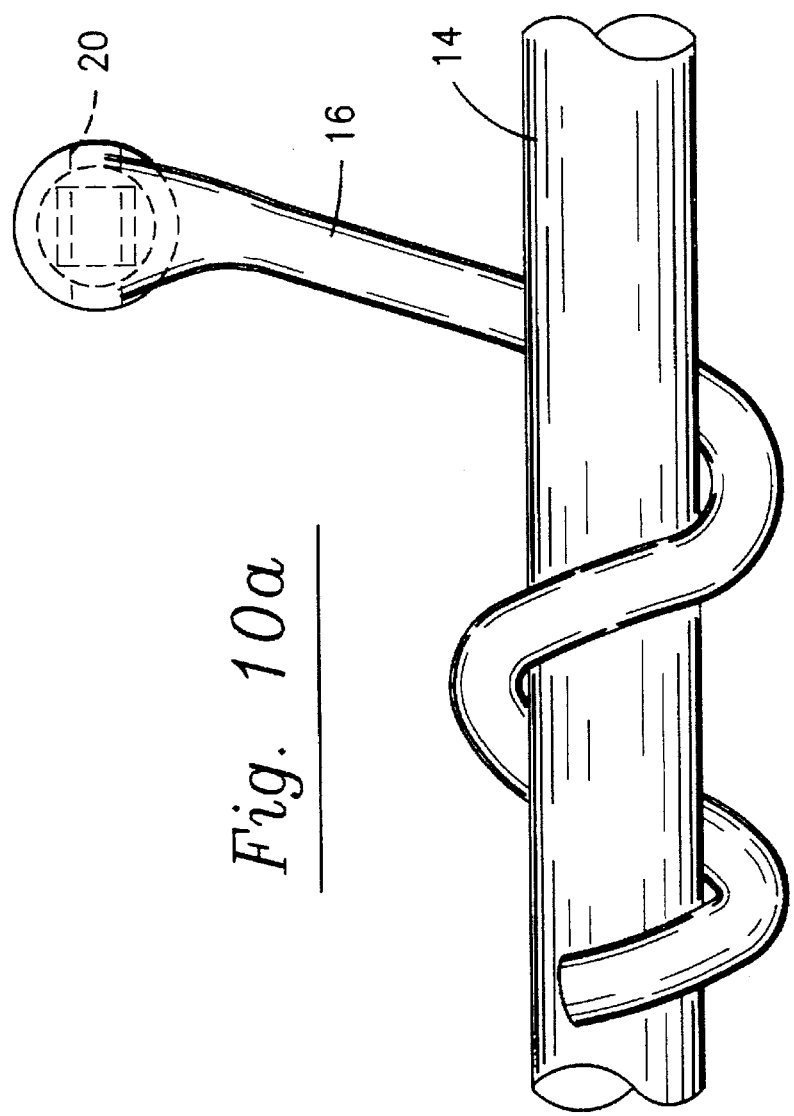

MOTORCYCLE TETHERING DEVICE

BACKGROUND OF THE INVENTION

1. Field of the Invention

The present invention concerns a method and device for securing a motorcycle parked on an asphalt or tarmacadam surface, thereby preventing misappropriation of the motorcycle.

2. Description of the Related Art

The average price of motorcycles has risen dramatically. Many popular motorcycles have a retail value in excess of $10,000.00, which does not include subsequent customizing costs and emotional investment. The cost of mechanical and cosmetic repair parts has also risen dramatically, prompting a surge of motorcycle thefts.

Owners of motorcycles are keenly aware of the ease in which a motorcycle can be stolen. A skilled and well equipped thief requires less than sixty seconds to "hot-wire" and drive off with an unsecured motorcycle. Two strong and able-bodied thieves can lift up a motorcycle off the ground and place it in a truck or van, even when both wheels of the motorcycle are locked.

Accordingly, the manufacturing and installing of anti-theft systems for motorcycles has become a significant industry. Most popular among currently known anti-theft systems for motorcycles include mechanical locks of various kinds, such as those employing wrap-around chains and steering locking mechanisms. The chain devices are heavy and difficult to haul on the motorcycle and can be cut in seconds with a variety of bolt cutters. Steering column locking mechanisms can easily be bent, broken or neutralized when an extraordinary force is applied to turn the steering column, thereby disabling the locking mechanism. Neither the chain type device nor the steering column lock can prevent a motorcycle from being carried away if the motorcycle is not securely attached to a permanent structure such as a lamp post. Such structures are not always available.

Electronic alarms are also popular devices for protecting motorcycles. However, such devices are expensive, are liable to tampering, and do not prevent removal of motorcycles.

U.S. Pat. No. 5,301,817 (Merritt) teaches a motorcycle security stand for securing the front wheel of a motorcycle, the stand being embedded in the ground. By securing the front wheel, the security device may deter theft of the motorcycle by "joy-riders". However, front wheels being easily replaced, a thief desiring to misappropriate the motorcycle would simply remove the front axle, leave the front wheel, an haul the motorcycle away in a van. Further, this security device presumes the presence of the permanent, pre-installed elaborate motorcycle parking stand. There is no suggestion for how to secure a motorcycle in a parking lot or on a street not provided with such a motorcycle parking stand.

There is thus a need for a system and device for securing a motorcycle on a street or parking lot where there is no permanent structure to which the motorcycle can be chained.

There is a need for a device which can securely protect a motorcycle against theft, yet is simple and inexpensive.

SUMMARY OF THE INVENTION

The primary objective of the present invention is to provide a device which can securely retain a motorcycle in a parking lot or on a street.

The invention has been accomplished by the development of a motorcycle anchoring device capable of being driven through asphalt, tarmac, or pavement, and to which a motorcycle can be tethered, thereby providing anti-theft security when no other means of security is available.

The device is in the form of a solid metal peg, stake, or spike (hereafter referred to as stake) designed to be driven through the asphalt or tarmacadam commonly used in a paved parking lot or roadway. The stake includes collapsible barbs or flukes which retract while the stake is being driven into the ground, then deploy after the spike is in the ground, particularly as someone attempts to extract the stake from the ground. The barbs thus provide some in-ground stability, but mainly serve to prevent the spike from being raised. The exposed upper end of the spike is designed to permit secure tethering of the motorcycle to the stake, thereby securing against unintended removal and usage. Once the stake is no longer required, the stake is simply and easily driven completely into the ground.

The foregoing has outlined rather broadly the more pertinent and important features of the present invention in order that the detailed description that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other motorcycle anchoring devices utilized for the same purposes of the present invention. It should also be realized by those skilled in the art that such equivalent structures do not depart from the spirit and scope of the invention as set forth in the appended claims.

BRIEF DESCRIPTION OF THE DRAWINGS

Further objectives and advantages of the present invention will become apparent from a careful reading of the detailed description provided hereinbelow, with appropriate reference to the accompanying drawings.

FIG. 5 is a perspective view of a motorcycle side stand immediately above the installed anchoring device.

FIG. 6 is a front cross-sectional view showing the motorcycle side stand fitted over the installed anchoring device FIG. 7 is a perspective view showing another embodiment of the anchoring device using a shaft of solid iron curled to be removably wrapped onto the frame when unlocked, and not capable of removal from the motorcycle when the locking end is placed over the exposed stake of the present invention, and a locking mechanism is locked through the exposed bore hole in the exposed stake.

FIG. 8 is a perspective view showing another embodiment of the anchoring device using a curved shaft of hollow pipe designed to be wrapped to fit the frame of the motorcycle when unlocked, then placed over the exposed stake, aligned in place, and secured by insertion of a locking mechanism through the bore holes in the pipe and stake.

FIG. 10 is a top view of the curved hollow pipe, indicating how the lockable end is placed over the stake and aligned for locking with a locking mechanism.

DETAILED DESCRIPTION OF THE INVENTION

Figures 1, 2, 3:
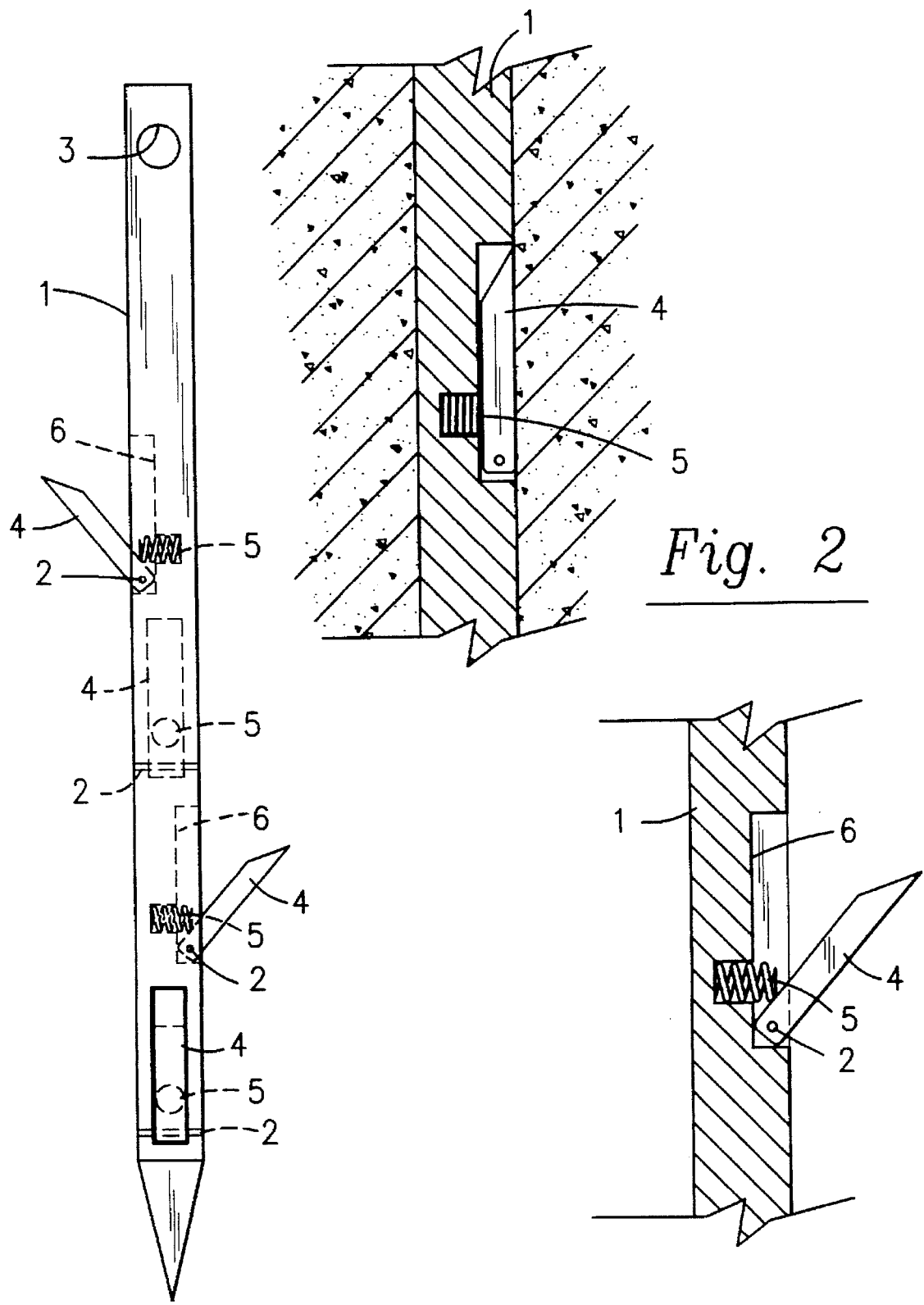
FIG. 1 is an elevated side view of the anchoring device ready for insertion into the asphalt, tarmac, or pavement.
FIG. 2 is a partial view show a fluke or barb of FIG. 1 in the retracted position while the spike is being driven into the asphalt, tarmac, or pavement.
FIG. 3 shows a fluke or barb of FIG. 1 in the extended position after an attempted removal of the spike from the asphalt, tarmac, or pavement.

The present invention is based upon the novel concept that a motorcycle could be anchored to the asphalt, tarmacadam or other surfacing commonly used in a paved parking lot or roadway, hereafter collectively referred to as pavement.

The invention was made only after solving a number of plausible technical and human factor concerns. For example, one would expect the property owner to object to the placement of a stake on his property, since the protruding stump of the stake would appear to represent a danger to the tires of subsequent traffic. Further, one would expect objections as to potential damage of the spike to the pavement. Further yet, one would not expect that any motorcyclist could or would want to bring an anchoring device and tools with him and drive an anchoring device into pavement. Thus, tethering a motorcycle to a stake would not, at first glance, appear to be a logical solution to the motorcycle security problem.

Further yet, it is not easy to drive a stake through pavement. Stakes, particularly those provided with barbs, are not designed for being driven into hardened pavement, and would be expected to deform. Consider, for example, stakes or pegs as shown in U.S. Pat. Nos. 3,986,366; 3,797,260; 963,075; 3,525,187; 1,169,821; 1,854,671; 697,031; 237,393; and 707,683 teach anchoring devices including barbs or flukes which deploy after the anchoring device has been seated. However, the anchoring devices are intended for introduction into soft earth, such as at the ocean floor or in yards, and are completely unsuitable for use on asphalt, tarmac, or pavement in parking lots.

Nevertheless, despite the above logical concerns, the present inventor has extensively experimented with, and has developed, a motorcycle anchoring device which does not damage pavement, yet which is capable of being driven through asphalt, tarmac, or pavement, and to which a motorcycle can be easily tethered, thereby providing anti-theft security when no other means of security is available.

The device is in the form of a solid metal peg, stake, or spike (hereafter referred to as stake) designed to be driven through the asphalt or tarmacadam commonly used in a paved parking lot or roadway. The stake includes collapsible barbs or flukes which fold in or retract while the stake is being driven into the ground, then deploy after the spike is in the ground, particularly as someone attempts to extract the stake from the ground. The barbs thus provide some in-ground stability, but mainly serve to prevent the spike from being raised. The exposed upper end of the spike is provided with a bore hole for receiving a mechanical locking device for the secure tethering of the motorcycle to the stake, thereby securing against unintended removal and usage. Once the stake is no longer required, the stake is simply and easily driven completely into the ground.

While it is well-known to introduce spikes, pegs, or anchors into the ground, and while it is known that these spikes may utilize barbs or flukes which deploy after the spike has been driven into the ground, no spikes have been specifically developed for driving into hard pavement as used in parking lots and designed to permit tethering of a motorcycle.

The spike is preferably a solid metal spike, preferably of hardened steel. Although the spike can have any desired cross-sectional shape and is not limited in any way, the spike preferably has a square or rectangular cross-section for ease of manufacture.

The spike is provided with one sharpened end and one blunt end. The sharp end is designed for penetrating pavement and may have a higher hardness than the balance of the spike. The blunt end is designed to withstand repeated pounding with a hammer for the amount of time and impact needed to drive the spike into the pavement. The blunt end is also provided with a borehole for receiving a locking mechanism. The blunt end is preferably flat for optimal diffusion of the impact of the hammer or impacting tool.

The spike is provided with folding barbs or flukes (hereafter simply barbs). The number of barbs is not limited but two to four is preferred from the cost-benefit aspect, since with more than four barbs the manufacturing cost increases but anchoring effect is not significantly improved, while with less than two barbs the anchoring effect is significantly diminished.

The barbs are designed to be completely or almost completely folded into the spike during introduction of the spike into the ground. The barbs are preferably provided with spring means for urging the barbs outwards in the case that retraction of the spike is attempted. However, it is also possible to design the barbs so that at least a part of the free tip remains exposed, such that any attempt to withdraw the spike backwards out of the pavement results in movement of pavement against the barb tips and deployment of the barbs.

The means for tethering the motorcycle to the anchoring device is not particularly limited and may be chains, cables, bent pipes or rods (as discussed below), or may even be by means of a suitable aperture provided in the motorcycle side-stand.

Various specific non-limiting embodiments of the invention will now be discussed in greater detail for illustrative purposes by reference to the drawings.

Referring now to FIG. 1, there is shown a side view of an anchoring device 1 as it would appear when deployed with barbs extended. The device comprises a solid metal stake with a plurality of hinged barbs 4 recessed in slots 6 and affixed at one end to the stake 1 by hinge means such as pins 2. As shown, the stake is generally square in cross-section, with on barb on each of the four sides. The top portion of the stake 1 is provided with a bore hole 3 through which a conventional locking mechanism such as a pad lock (not shown) can be attached. The bottom end of the spike is pointed for easy entry into pavement.

The hinged barbs 4 may be of machined metal or any material sufficiently strong to increase the difficulty of extraction of the stake from the pavement. The barbs 4 may be solid metal, rectangular in cross section. One side of the free end of each barb 4 is undercut so that the opposite side tapers to a sharp edge for gripping purposes.

Preferably, in order to insure that barbs 4 deploy during an attempted extraction of the stake from the ground, compression spring means 5 are recessed internally with respect to each barb such that the spring is compressed by the inwardly folding barb during insertion of the stake into the pavement. Upon attempting to extract the spike from the ground, the spring means urge the barbs outwards to insure that the barbs "catch" and anchor the spike in the ground. The spring means may be helical coiled metal springs, blocks of rubber, or any other means capable of storing energy of compression and subsequently urging the barbs outwardly. The spring means 5 are affixed in any of various well known ways.

The barbs 4 are preferably located such that no two barbs are provided in the same segment of spike, are in progressively rotated positions on cylinder 1, so that when the barbs 4 are extended from and the anchor is driven into the ground, the barbs 4 will dig in. The embodiment shown has the barbs 4 are symmetrically rotated in 90 degree increments around the stake 1 with a relatively large distance between barbs 4. However, various changes in the number, size and position of the barbs 4 are optional, dependent upon the requirements of the ground application in which the device is to be used.

FIG. 2 is a partial illustration showing an anchoring device inserted into the ground with the barb 4 in a retracted position. The barb 4 retracts while being driven into the ground and once the barbs 4 are beneath the earth and an attempt is made to extract the stake, the compressed spring 5 forces the barb 4 to extend into the earth, as shown in FIG. 3, thereby digging in. The tapered shaft of the barb 4 digs in the ground firmly the more the stake is pulled upwardly, thereby ensuring the anchoring device can not be pulled from the ground in a relatively easy manner.

The maximum length of the stake 1 is limited by what can be practically carried in a storage compartment or strapped to the seat of a motorcycle, but in practice, for the purposes of securing a motorcycle, a length of 6 to 12 inches is entirely adequate. The length of the stake can vary, and a suitable stake may be selected from a variety pack of stakes depending on the conditions of the parking location chosen.

To install, the spike is simply hammered into the ground with a hammer or other instrument capable of impacting. For example, it would be possible to use an explosive charge such as a shotgun shell to propel the spike into the ground. However, while an explosive charge is preferred for convenience, it is also more dangerous, and is thus a less preferred embodiment.

The spike is hammered into the ground until only so much of the spike protrudes as is necessary for the tethering and locking of the motorcycle.

Figure 4:
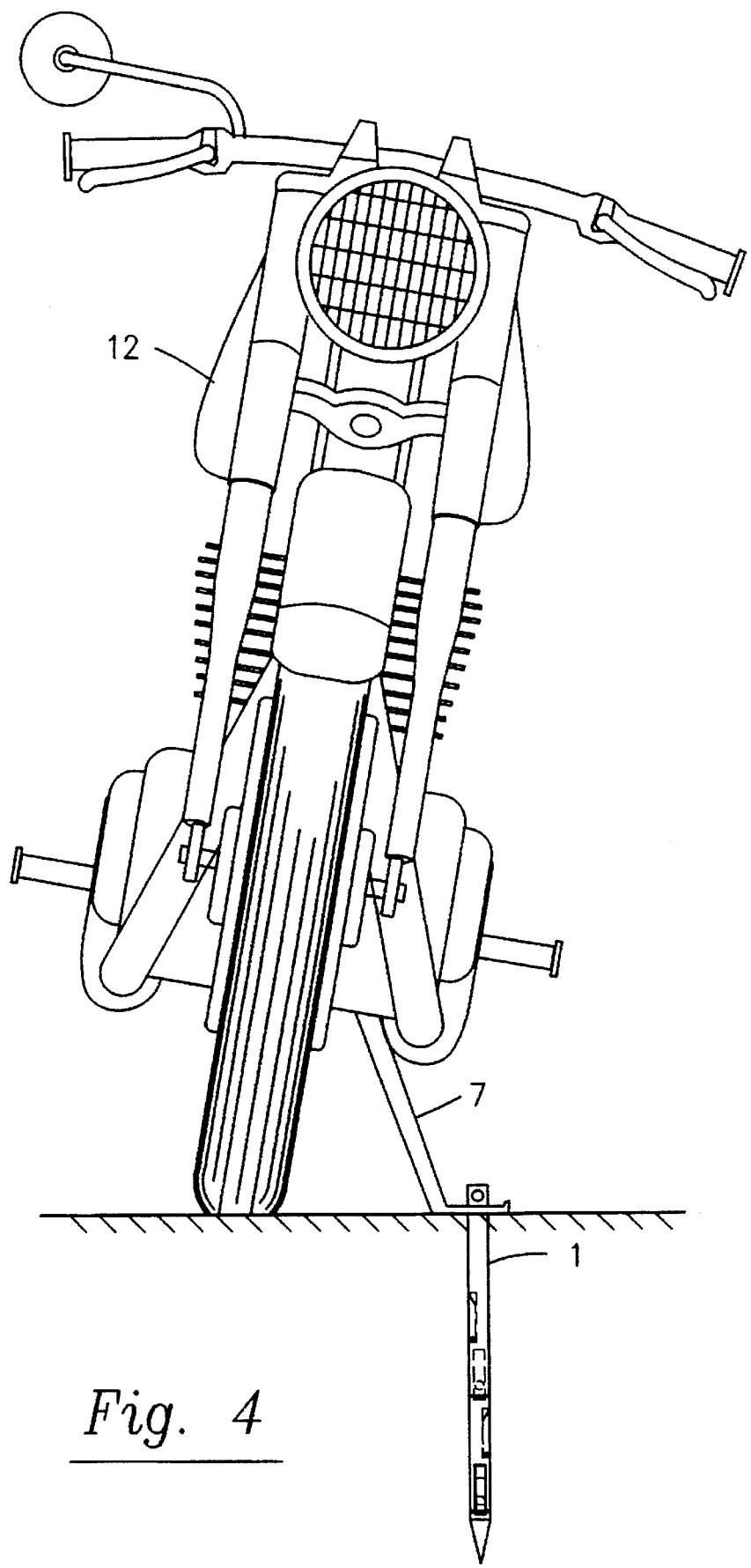
FIG. 4 is a front view of a motorcycle with the motorcycle side stand fitted over the installed anchoring device.

FIGS. 4–6 show an embodiment wherein a motorcycle 12 provided with a side stand 7 of ordinary type. The flattened end part 8 of the side stand 7 is bent at an appropriate angle to constitute a contact surface with the ground when the motorcycle is parked, and is provided with an aperture 9 larger than the cross-section of the spike 1. During parking, the aperture 9 of the flattened end 8 of the side stand 7 is placed over the anchoring device 1, so that the contact surface of the side stand rests on the ground surface 11 to support the body of the motorcycle 12 utilizing the side stand assembly 7. This side stand secured parking position using the present invention is shown in FIG. 6, with a not-shown locking device installed through bore hole 3.

Of course, the motorcycle may be parked first, and thereafter the stake can be driven through the aperture 9.

Obvious alternatives to the embodiment shown in FIGS. 4–6, wherein the existing side stand was modified by providing aperture 9, include (a) welding a flat strip of metal approximately 2 inches by 1.5 inches onto the end or side of the contact patch 8 of the side stand, the sheet of metal provided with an aperture 9, and (b) welding a metal chain link or other circular piece of metal to the end of the side stand.

FIG. 7 shows another embodiment of the anchoring device according to the present invention, wherein a solid bent shaft of iron 13 is utilized as a tether in lieu of direct locking of a motorcycle side stand. The shaft of iron 13 is curved around itself one and one-half times at one end providing a "pig-tail" with an internal diameter large enough to accommodate an ordinary base frame member 14 of a motorcycle. The other end of the iron shaft 13 is curved to form a loop 15. After the pig-tail end of the shaft is hooked on the motorcycle frame, the end with loop 15 is placed over the protruding stake 1 and locking mechanism (not shown) is inserted through bore hole 3. Once the pig-tailed shaft is so installed and the locking mechanism locked, the pig-tailed end can not be disengaged from the motorcycle frame member 14 until after the loop end of the tether is released from stake 1.

Of course, rather than have the end of the shaft 13 bent to form a loop, it would be possible to weld a loop of metal onto the anchoring end shaft.

FIG. 8 indicates still another embodiment of the anchoring device according to the present invention, wherein a hollow pipe 16 is used in place of a solid metal shaft, the hollow pipe being curved around itself one and one-half times at one end providing an internal diameter large enough to accommodate the motorcycle frame member 14 described in FIG. 7 above. The other end of the hollow pipe 16 is curved at a downward angle 17 and includes hole 20 matching in diameter to the exposed top of stake 1. The end of the pipe 16 is placed over the stake 1 and the holes 20 align to accommodate a locking mechanism (not shown). During parking, the circular end 17 of the hollow pipe 16 fits over the stake 1 of the anchoring device.

Figure 9:
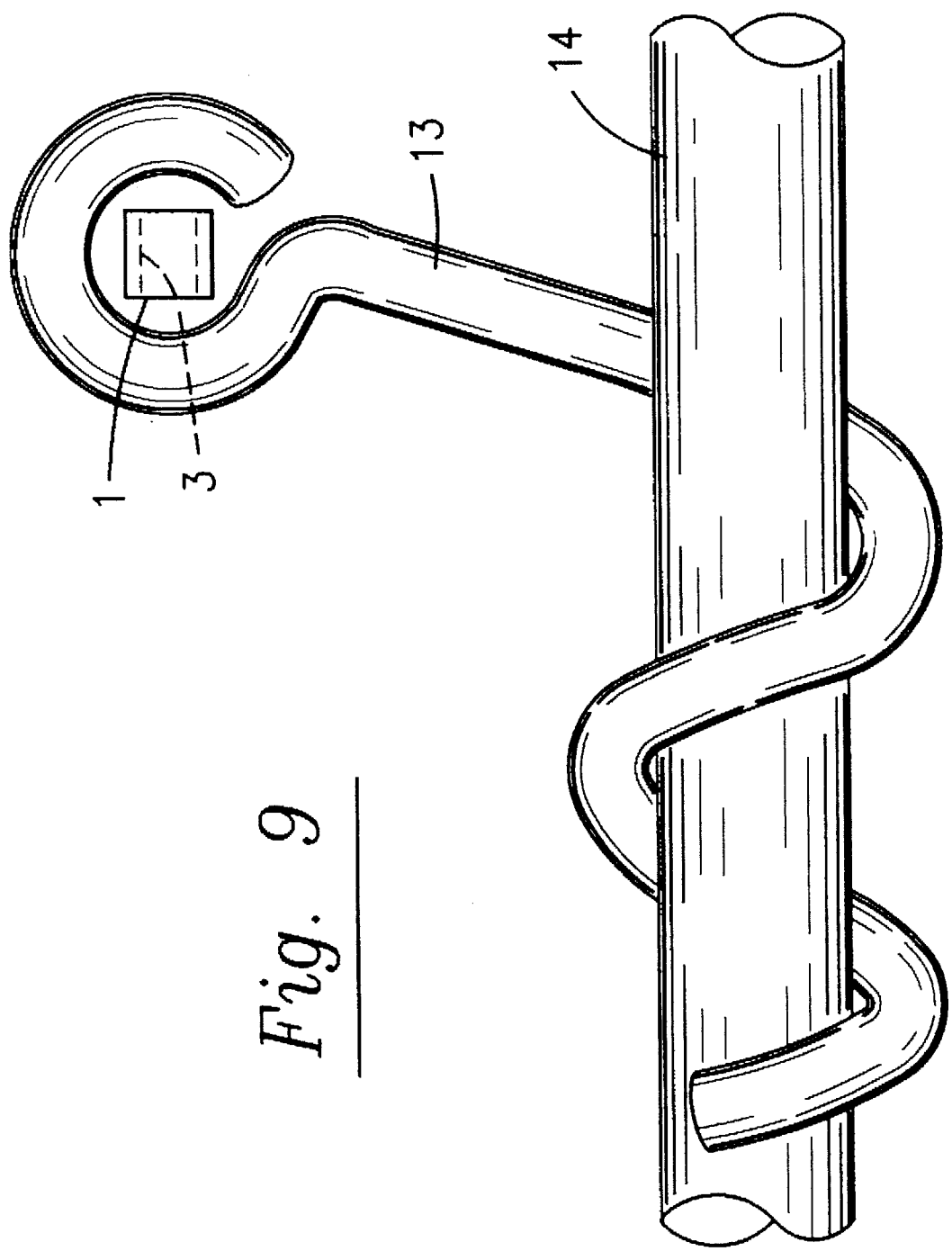
FIG. 9 is a top view of the curved shaft of solid iron, indicating how the circular end is placed over and around the stake, such that a locking mechanism can be used to secure the iron shaft to the exposed stake.

FIG. 9 is a top view showing how the solid iron shaft 13 described in FIG. 7 wraps around the motorcycle lower frame member 14, and the bottom end of the iron shaft 13 is placed over the stake 1 of the anchoring device, so that a locking mechanism can then be fastened securely through the bore hole 3.

FIGS. 10a and 10b indicate how the hollow pipe 16 described in FIG. 8 wraps around the motorcycle lower frame member 14, and the bottom end of the pipe shaft 16 is placed over the protruding stake 1, with the bore holes 3, 20 aligned such that a locking mechanism can then be fastened securely through the bore holes 3, 20.

Where the motorcycle is repetitively parked in the same area, such as in a private parking space, the stake may be left protruding from the ground for reuse. Where the motorcycle was intended to be secured only once, the stake is eliminated from view by simply pounding it into the ground so that all that remains is the small square patch of the upper surface of the stake.

Although the motorcycle anchoring device was first designed as a system and device for anchoring motorcycles, it will be readily apparent that the system and device is capable of use in a number of other applications, such as anchoring of trailers, out-door art-works, etc. Although this invention has been described in its preferred form with a certain degree of particularity with respect to a motorcycle anchoring device, it is understood that the present disclosure of the preferred form has been made only by way of example and that numerous changes in the details of structures and the composition of the combination may be resorted to without departing from the spirit and scope of the invention.

Now that the invention has been described,

What is claimed is:

1. A combination motorcycle and device for securing said motorcycle on pavement, said device comprising:

(a) a stake designed for driving into pavement, said stake having two or more axial segments, said stake having a sharp end and a blunt end, said blunt end provided with a bore hole therethrough for receiving a locking mechanism, said stake provided with at least two hinged barbs, said barbs arranged such that no two barbs are provided in the same axial segment of the stake, said barbs designed to deploy to prevent extraction of the stake once the stake is driven into said pavement;

(b) a motorcycle side stand including means for tethering;

(c) a mechanism;

wherein said means for tethering is a metal link welded to the side stand of the motorcycle.

2. A method for securing a motorcycle on pavement, the method comprising:

(a) obtaining a stake designed for driving into pavement, said stake having two or more axial segments, said stake having a sharp end and a blunt end said blunt end provided with a bore hole therethrough for receiving a locking mechanism, said stake provided with at least two hinged barbs, said barbs arranged such that no two barbs are (provided in the same axial segment of the stake, said barbs designed to deploy to prevent extraction of the stake once the stake is driven into said pavement;

(b) driving said stake into pavement, leaving a sufficient amount of said stake exposed to permit tethering said motorcycle to said stake;

(c) tethering said motorcycle to said stake; and (d) locking a locking mechanism through said bore hole to prevent untethering of said motorcycle, wherein said tethering is accomplished by placing a side stand of said motorcycle over said stake, said side stand provided with an aperture larger than and capable of fitting over said stake.

* * * * *